(12) United States Patent
Zhou et al.

(10) Patent No.: US 6,813,584 B2
(45) Date of Patent: Nov. 2, 2004

(54) MICRO AZIMUTH-LEVEL DETECTOR BASED ON MICRO ELECTRO-MECHANICAL SYSTEMS AND A METHOD FOR DETERMINATION OF ATTITUDE

(75) Inventors: Zhaoying Zhou, Beijing (CN); Rong Zhu, Beijing (CN); Xiaohao Wang, Beijing (CN); Xiongying Ye, Beijing (CN); Shenshu Xiong, Beijing (CN); Xuefeng Sun, Beijing (CN); Junhua Zhu, Beijing (CN); Qiang Wei, Beijing (CN); Guanglong Wang, Beijing (CN)

(73) Assignee: Tsinghua University, Beijing (CN)

( * ) Notice: Subject to any disclaimer, the term of this patent is extended or adjusted under 35 U.S.C. 154(b) by 0 days.

(21) Appl. No.: 10/094,991

(22) Filed: Mar. 12, 2002

(65) Prior Publication Data

US 2002/0188416 A1 Dec. 12, 2002

(30) Foreign Application Priority Data

Mar. 30, 2001 (CN) ........................................ 01110135 A

(51) Int. Cl.$^7$ .............................................. G01C 17/00
(52) U.S. Cl. ..................................................... 702/151
(58) Field of Search ............................... 702/38, 94, 95, 702/141, 150, 151, 153; 701/11, 200, 220

(56) References Cited

U.S. PATENT DOCUMENTS

| | | | |
|---|---|---|---|
| 5,090,231 A | | 2/1992 | Gallagher ..................... 702/92 |
| 5,333,110 A | | 7/1994 | Al-Attar ....................... 701/207 |
| 5,854,843 A | * | 12/1998 | Jacknin et al. .............. 381/309 |
| 6,208,936 B1 | | 3/2001 | Minor et al. ................. 701/220 |
| 6,243,660 B1 | | 6/2001 | Hsu et al. .................... 702/160 |
| 6,421,622 B1 | * | 7/2002 | Horton et al. ................ 702/95 |
| 6,476,610 B1 | * | 11/2002 | Wiegert et al. ............. 324/345 |
| 6,543,146 B2 | * | 4/2003 | Smith et al. .................. 33/356 |
| 6,647,352 B1 | * | 11/2003 | Horton ........................ 702/151 |
| 6,725,173 B2 | * | 4/2004 | An et al. ..................... 702/141 |

OTHER PUBLICATIONS

M.J. Caruso, "Applications of Magnetic Sensors for Low Cost Compass Systems", http//www.ssec.honeywell.com/magnetic/datasheets/lowcost.pdf, Mar. 2000.*

60/230,567, An et al., "Digital signal processing method and system thereof for precision orientation measurements", Sep. 2, 2000.*

"Honeywell Sensor Products: Digital Compass Module HMR 3000," http://www.ssec.honeywell.com/magnetic/datasheets/hmr3000.pdf, Dec. 1999.

(List continued on next page.)

*Primary Examiner*—Michael Ngheim
(74) *Attorney, Agent, or Firm*—Venable LLP; Man Li

(57) ABSTRACT

A system and method for determining attitude using triaxial micro electro-mechanical accelerometer-magnetometer sensors. The triaxial accelerometer-magnetometer sensors measure the triaxial components of the local gravity and magnetic field along three sensing axes of the sensors. The misalignment of the components due to nonorthogonal triaxial assembling of the sensors is estimated via performing three optical alignments and is further compensated in the sensing outputs. A micro-cube with three orthogonal coated mirrors is fixed on the circuit board of the system for implementing the optical alignments. The compensated sensing components are processed to figure out the attitude using Orientation Cosine Conversion of the local gravity and magnetic field. The computation for determining the attitude is based on the inverse tangent of the ratio of the processed components, which is more precise than the computation using the absolute values of the components.

6 Claims, 7 Drawing Sheets

OTHER PUBLICATIONS

"Set/Reset Pulse Circuits For Magnetic Sensors AN–201," http://www.ssec.honeywell.com/magnetic/datasheets/an201.pdf, May 1996.

"Magnetic Sensor Hybrid Application Circuit AN–202," http://www.ssec.honeywell.com/magnetic/datasheets/an202.pdf, Sep. 1995.

"Compass Heading Using Magnetometers AN–203," http://www.ssec.honeywell.com/magnetic/datasheets/an203.pdf, Jul. 1995.

"Getting Stable Output From HMR3000 Compass Module AN–208," http://www.ssec.honeywell.com/magnetic/datasheets/an208.pdf, Nov. 1998.

* cited by examiner

MICRO AZIMUTH-LEVEL DETECTOR BASED ON MICRO ELECTRO-MECHANICAL SYSTEMS AND A METHOD FOR DETERMINATION OF ATTITUDE

FIELD OF THE INVENTION

This present invention is generally subject to the field of instrument & measurement technology based on Micro Electro-mechanical Systems (MEMS), especially relates to a novel design of micro navigation system.

BACKGROUND OF THE INVENTION

Navigation is actually to determine position and attitude for a vehicle by using kinds of sensors. The conventional navigation schemes can be cataloged as: (1) Inertial navigation system, uses gyroscopes and accelerometers to measure rate of rotation and acceleration respectively. However gyroscope is always expensive, has relative big size, slow start-up and long-term drift. (2) Imaging navigation system is composed of camera, units for processing and recognizing, etc. But the imaging processing is complicated and difficult to be implemented in real time. (3) Global position system (GPS), comprises 24 satellites, receiver and signal-processor. It highly depends on the outside information from satellites.

Compared with the conventional methods, the burgeoning MEMS navigation equipments on the basis of micro silicon-based sensors can put miniaturization, practicability and intelligence together. The MEMS-based navigation systems take advantages of low cost, small size, lightweight and adequate performances with respect to the conventional systems.

MEMS is based on integration of micro-electron technology and micro-mechanics technology. A main representative of MEMS-based attitude system is Honeywell Digital Compass HMR3000. It is a tilt compensated compass that uses tilt sensor for enhanced performance up to ±40° tilt range. Its composing and block diagram is shown in FIG. 1: liquid filled tilt sensors 11 determine inclination angles, the heading (or azimuth) is calculated 13 from the tilt information and the three magnetic field components detected by triaxial magnetometers 12, the angles then can be communicated with PC 15 through RS-232 14. HMR3000 measures 0°~360° heading within ±40° tilt, and the heading accuracy is ±1° for level, but ±2° for incline. The tilt range is only ±40°, and the tilt accuracy is ±0.4° for 0°~20°, and ±0.6° when exceed ±20°.

The disadvantages of HMR3000 are:
(1) The tilt range is small, only covers ±40°.
(2) The measurement accuracy will decline with bevel rising.

SUMMARY OF THE INVENTION

The present invention has a novel structure and attitude calculation algorithm to avoid the foregoing disadvantages.

The object of the present invention is to design a novel MEMS attitude system with nonrestrictive tilt range and excellent performance. The inventer designs architecture, composing of three-axis orthogonal accelerometers and three-axis orthogonal magnetometers, and schemes out the optimum attitude calculation algorithm for getting higher accuracy and higher reliability.

During sensors assembly, the directions of the tilt sensor (accelerometers) must be carefully aligned with the corresponding magnetic axes, and the three axes in the same orthogonal placement must be mutually orthogonalized strictly. It is critical for determining the measurement accuracy. Aiming at this assembling problem, the present invention constructs an optical alignment approach against the misalignment.

The present integrative system can attain overall attitude (−90°~90° for pitch, −180°~180° for roll, 0°~360° for heading) with high accuracy in any tilt, and possesses characteristics as solid-state structure, high accuracy, small size, lightweight, low consumption, fast start-up and low cost.

The invention is about a novel micro azimuth-level detector based on MEMS, which comprises multi-sensors, A/D converter for converting the analog signals of the sensors to the digital signals, microprocessor for calculation of the digital signals, RS-232 for connecting the microprocessor with PC, and further comprises signal-processing in the microprocessor and Operation-Display software in PC, wherein multi-sensors are triaxial silicon accelerometers with the processing circuit and triaxial silicon magnetometers with the processing circuit.

The foregoing the signal-processing and the Operation-Display software include signal-syncretizing, attitude computation and graphical Operation-Display interface.

For overcoming the misalignment in assembling, a micro-cube with three micro-mirrors in orthogonal directions using for optical alignment is added to the system structure.

The signal-syncretizing is combination of signal-filter and electric/physical (E/P) signal conversion.

For signal-filter, 2nd-order FIR filter is employed:

$$y(n) = h_0 x(n) + h_1 x(n-1)$$

where $x(n), x(n-1)$ are the output of sensor (input of the filter) and its backward shift, $h_0$, $h_1$ are constant coefficients, $y(n)$ is the output of the filter.

For E/P signal-conversion, that is actually conversion from electrical voltage $v(n)$ to corresponding physical signal $u(n)$:

$$u(n) = (v(n) - v_0)/k_v$$

where $v_0$ is zero-point, and $k_v$ is scale factor. $v_0$ and $k_v$ are obtained in advance by calibration.

The attitude computation is as following:

Establish two reference coordinate systems: the geographic coordinate system (GCS) shown in FIG. 2(a) and the vehicle coordinate system (VCS) shown in FIG. 2(b). Defining the three orthogonal axes of the GCS as North21-East22-Ground23 (N-E-G), and the three orthogonal axes of the VCS as X-Y-Z (X 31 refers to the forward direction of the vehicle, Y 32 refers to the left-right direction of the vehicle, and Z 33 refers to downward direction of the vehicle).

The rotations of the VCS relative to the GCS represent the attitude status of the vehicle. The terms ROLL ($\gamma$), PITCH ($\theta$) and HEADING ($\psi$) are commonly used in aviation to represent attitude: ROLL refers to the rotation round the X-axis, PITCH refers to the rotation around the Y-axis, and HEADING refers to the rotation round the G-axis. The two representations of the same vector in GCS and VCS can be transformed each other through the Orientation Cosine Matrix $C_n^b$.

$$C_n^b = \begin{bmatrix} \cos(N,X) & \cos(E,X) & \cos(G,X) \\ \cos(N,Y) & \cos(E,Y) & \cos(G,Y) \\ \cos(N,Z) & \cos(E,Z) & \cos(G,Z) \end{bmatrix}$$

$$= [T_{ij}]_{3\times3}$$

The element $T_{ij}$ of $C_n^b$ is composed of pitch, roll and heading. The three magnetometers are assembled along the X-Y-Z axes to form an orthogonal placement. And the assembling placement is also for the three accelerometers. The independent X, Y, and Z magnetic and gravity readings $[x_M, y_M, z_M]^T$ and $[x_g, y_g, z_g]^T$, which figure the independent X, Y, Z components of the earth's magnetic and gravity field, can be transformed back to the geographic coordinates by applying the Cosine Matrix $C_n^b$. Further considering about errors $[e_{Mx}\ e_{My}\ e_{Mz}]^T$ and $[e_{gx}\ e_{gy}\ e_{gz}]^T$, the following equations are attained (where H is magnetic hall effect, $\beta$ is magnetic dip angle, $f_g$ is gravity acceleration):

$$\begin{bmatrix} x_M \\ y_M \\ z_M \end{bmatrix} = HC_n^b \begin{bmatrix} \cos\beta \\ 0 \\ \sin\beta \end{bmatrix} + \begin{bmatrix} e_{Mx} \\ e_{My} \\ e_{Mz} \end{bmatrix} \Rightarrow \begin{cases} H\times(T_{11}\cos\beta + T_{13}\sin\beta) + e_{Mx} = x_M \\ H\times(T_{21}\cos\beta + T_{23}\sin\beta) + e_{My} = y_M \\ H\times(T_{31}\cos\beta + T_{33}\sin\beta) + e_{Mz} = z_M \end{cases}$$

$$\begin{bmatrix} x_g \\ y_g \\ z_g \end{bmatrix} = C_n^b \begin{bmatrix} 0 \\ 0 \\ f_g \end{bmatrix} + \begin{bmatrix} e_{gx} \\ e_{gy} \\ e_{gz} \end{bmatrix} \Rightarrow \begin{cases} x_g = T_{13}f_g + e_{gx} \\ y_g = T_{23}f_g + e_{gy} \\ z_g = T_{33}f_g + e_{gz} \end{cases}$$

In the equations above, the errors can be eliminated through signal filter and error compensation.

From the foregoing equations, the three attitude angles are figured out via inverse tangent. The procedures of computation are:

Step one: calculating roll $\gamma$ according to Table 1 and value of $\gamma_{ref}$ $$\gamma_{ref} = \text{arctg}(y_g/z_g),$$

TABLE 1

| $z_g$ | $y_g$ | $\gamma$ | Quadrant |
|---|---|---|---|
| →0 | + | 90° | |
| →0 | − | −90° | |
| + | + | $\gamma_{ref}$ | (0°, 90°) |
| + | − | $\gamma_{ref}$ | (−90°, 0°) |
| − | + | $\gamma_{ref}$ +180° | (90°, 180°) |
| − | − | $\gamma_{ref}$ −180° | (−180°, −90°) |

Step two: calculating pitch $\theta$ according to $$\theta = -\text{arctg}(x_g\cdot\cos\gamma/z_g),$$

Step three: and calculating heading $\psi$ according to Table 2, $\psi_{ref}$, Xh and Yh, $$Xh = x_m\cos\theta + (y_m\sin\gamma + z_m\cos\gamma)\sin\theta$$

$$Yh = z_m\sin\gamma - y_m\cos\gamma$$

$$\psi_{ref} = \text{arctg}\left(\frac{z_m\sin\gamma - y_m\cos\gamma}{x_m\cos\theta + (y_m\sin\gamma + z_m\cos\gamma)\sin\theta}\right) = \text{arctg}\left(\frac{Yh}{Xh}\right),$$

TABLE 2

| Xh | Yh | $\psi$ | Quadrant |
|---|---|---|---|
| →0 | + | 90° | |
| →0 | − | 270° | |
| + | + | $\psi_{ref}$ | (0°, 90°) |
| + | − | 360° +$\psi_{ref}$ | (270°, 360°) |
| − | + | 180° +$\psi_{ref}$ | (90°, 180°) |
| − | − | 180° +$\psi_{ref}$ | (180°, 270°) |

For eliminating the misalignment in assembling, a micro-cube is fixed on the circuit board. The micro-cube is a small right angle cube with three orthogonal coated mirrors, which are used for reflecting beams. It can be bought from Industrial Optics Company. It is a kind of externally coated cubic prism, which has an enhanced aluminum coating on the three orthogonal side-faces. The three beams upright the three orthogonal mirrored surfaces form a 3-D orthogonal beam adjustment X-Y-Z. X-Y-Z is defined as the datum frame of the groupware. The groupware is actually circuit board where three-axis accelerometers and three-axis magnetometers are installed. Define X'-Y'-Z' as the frame of the accelerometers, and X"-Y"-Z" as the frame of the magnetometers. The optical alignment is carried out through three steps below:

Step one: Three optical alignments (a) Align X-Y-Z to North (magnetic north)-East-Ground by beam-based alignment. The independent components of the gravity field along N(X)-E(Y)-G(Z) axis are $[0,0,f_g]^T$, the independent components of the earth's magnetic field along N(X)-E(Y)-G(Z) axis are $[H_N,0,H_G]^T$. The relation between the three accelerometers' readings $[X'_a,Y'_a,Z'_a]^T$ and $[0,0,f_g]^T$ is:

$$\begin{cases} X'_a = f_g \cdot \cos(X', Z) \\ Y'_a = f_g \cdot \cos(Y', Z) \\ Z'_a = f_g \cdot \cos(Z', Z), \end{cases}$$

The relation between the three magnetometers' readings $[X''_a,Y''_a,Z''_a]^T$ and $[H_N,0,H_G]^T$ is:

$$\begin{cases} X''_a = H_N \cdot \cos(X'', X) + H_G \cdot \cos(X'', Z) \\ Y''_a = H_N \cdot \cos(Y'', X) + H_G \cdot \cos(Y'', Z) \\ Z''_a = H_N \cdot \cos(Z'', X) + H_G \cdot \cos(Z'', Z); \end{cases}$$

(b) Align X-Y-Z to East-Ground-North(magnetic north) by beam based alignment. Here the relation between the three accelerometers' readings $[X'_b,Y'_b,Z'_b]^T$ and the gravity XYZ-stage components $[0,f_g,0]^T$ is:

$$\begin{cases} X'_b = f_g \cdot \cos(X', Y) \\ Y'_b = f_g \cdot \cos(Y', Y) \\ Z'_b = f_g \cdot \cos(Z', Y), \end{cases}$$

The relation between the three magnetometers' readings $[X''_b,Y''_b,Z''_b]^T$ and the magnetic XYZ-stage components $[0,H_G,H_N]^T$ is:

$$\begin{cases} X_b'' = H_N \cdot \cos(X'', Z) + H_G \cdot \cos(X'', Y) \\ Y_b'' = H_N \cdot \cos(Y'', Z) + H_G \cdot \cos(Y'', Y) \\ Z_b'' = H_N \cdot \cos(Z'', Z) + H_G \cdot \cos(Z'', Y); \end{cases}$$

(c) Align X-Y-Z to Ground-North(magnetic north)-East by beam based alignment. The relation between the three accelerometers' readings $[X'_c, Y'_c, Z'_c]^T$ and the gravity XYZ-stage components $[f_g, 0, 0]^T$ is:

$$\begin{cases} X'_c = f_g \cdot \cos(X', X) \\ Y'_c = f_g \cdot \cos(Y', X) \\ Z'_c = f_g \cdot \cos(Z', X), \end{cases}$$

The relation between the three magnetometers' readings $[X''_c, Y''_c, Z''_c]^T$ and the magnetic XYZ-stage components $[H_G, H_N, 0]^T$ is:

$$\begin{cases} X''_c = H_N \cdot \cos(X'', Y) + H_G \cdot \cos(X'', X) \\ Y''_c = H_N \cdot \cos(Y'', Y) + H_G \cdot \cos(Y'', X) \\ Z''_c = H_N \cdot \cos(Z'', Y) + H_G \cdot \cos(Z'', X). \end{cases}$$

Step two: Determining the misaligned angles

Using the relation equations established in step one, figure out the Orientation Cosine Matrix Mg between the datum frame X-Y-Z and the acceleration frame $$Mg = \begin{bmatrix} \cos(X', X) & \cos(X', Y) & \cos(X', Z) \\ \cos(Y', X) & \cos(Y', Y) & \cos(Y', Z) \\ \cos(Z', X) & \cos(Z', Y) & \cos(Z', Z) \end{bmatrix}$$

and the Orientation Cosine Matrix Mm between X-Y-Z and the magnetic frame X"-Y"-Z", $$Mm = \begin{bmatrix} \cos(X'', X) & \cos(X'', Y) & \cos(X'', Z) \\ \cos(Y'', X) & \cos(Y'', Y) & \cos(Y'', Z) \\ \cos(Z'', X) & \cos(Z'', Y) & \cos(Z'', Z) \end{bmatrix}.$$

Step three: Compensating the misaligned angles

When using the azimuth-level detector to measure attitude, always switch the outputs of the sensors into the orthogonal tuning X-Y-Z using the determined Orientation Cosine Matrix Mg and Mm.

$$\begin{bmatrix} x_g \\ y_g \\ z_g \end{bmatrix} = Mg^{-1} \begin{bmatrix} x'_g \\ y'_g \\ z'_g \end{bmatrix},$$

$$\begin{bmatrix} x_M \\ y_M \\ z_M \end{bmatrix} = Mm^{-1} \begin{bmatrix} x'_M \\ y'_M \\ z'_M \end{bmatrix}.$$

Where, $[x'_g, y'_g, z'_g]^T$, $[x'_M, y'_M, z'_M]^T$ are respectively readings of three-axis accelerometers and three-axis magnetometers. And $[x_g, y_g, z_g]^T$, $[x_M, y_M, z_M]^T$ are respectively the orthogonal tuning XYZ-stage components of the corresponding sensors.

The characteristics and effects are:

The present invention has largely improved on the composing, and the attitude computation algorithm. Three-axis silicon accelerometers make up of the inclinometer as the accelerometer can provide three independent orthogonal components of the earth's gravity acceleration. The accelerometer-based inclinometer acts on not only the tilt-compensation, but also measurement for any pitch and roll. Through the Orientation Cosine Matrix $C_n^b$, the relation equations between GCS and VCS can be established, further export the three attitude angles (pitch, roll, heading). The micro attitude detector of the invention is an integration of multi-MEMS-sensors, such as MEMS accelerometers and MEMS magnetometers. By taking the benefits of MEMS, the system takes on solid-state structure, small size, lightweight, low consumption, fast start-up and low cost.

Through the said inverse tangent algorithm of the invention are obtained high attitude accuracy in the full-scale range and excellent robust for withstanding effect field change. By optical alignment, the misalignment of each sensor axis deflective from the datum frame X-Y-Z are detected and compensated so as to make the attitude accuracy further largely enhanced.

As will be realized, the invention is capable of other and different embodiments, and its several details are capable of modifications in various obvious respects, all without departing from the invention. Accordingly, the drawings and description thereof are to be regarded as illustrative in nature, and not as restrictive.

BEST MODES FOR CARRYING OUT THE INVENTION

Figure 1:
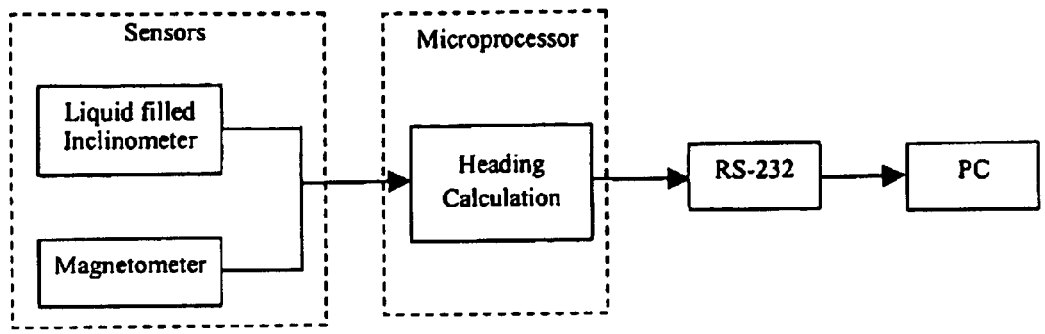
FIG. 1 is the composition and block diagram of HMR3000.
Figure 2:
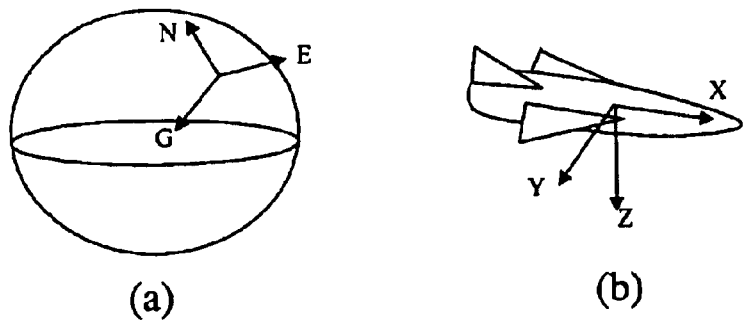
FIG. 2 is the view of vehicle coordinate system and geographic coordinate system.
Figure 3:
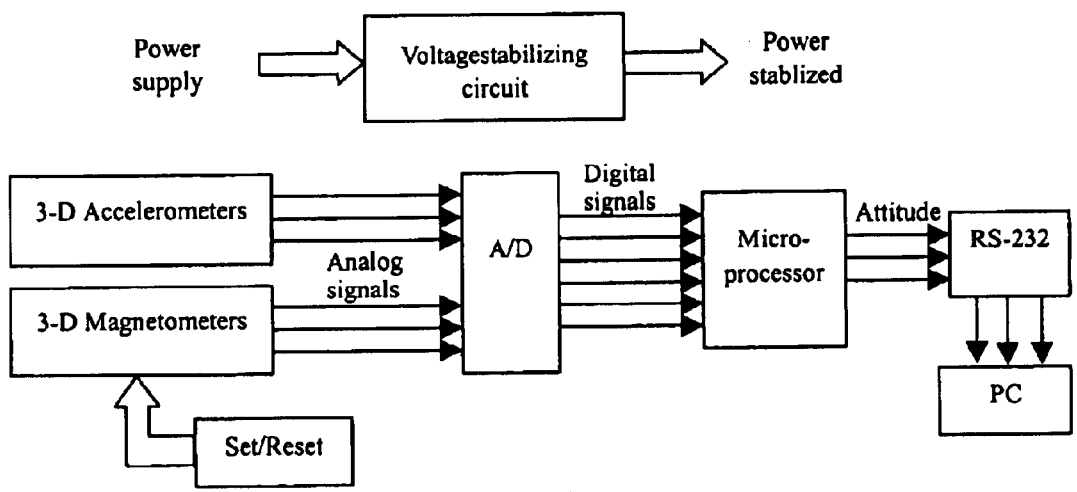
FIG. 3 is the composition and block diagram of the present invention.

The hardware composition and the block diagram of the present invention are shown in FIG. 3. The hardware includes: a micro-cube with three orthogonal mirrors 49, three-axis MEMS accelerometers 42 and the processing circuit, three-axis MEMS magnetometers 43 and the processing circuit, magnetic Set/Reset pulse circuit 48 (reference from Honeywell), voltagestabilizing circuit 41, A/D converter 44, microprocessor 45, RS-232 46 and PC 47. The micro-cube with three orthogonal coated mirrors is for accomplishing optical alignment to deal with axis-misalignment. The three-axis accelerometers measure the three independent components of gravity acceleration and provide signals indicative of the measurement. The three-axis magnetometers measure the three independent components of the earth's magnetic field and provide signals indicative of the measurement. Magnetic Set/Reset pulse circuit is for eliminating the effects of past magnetic effects. The voltagestabilizing circuit is to convert 7~12 volt power supply to 5 volt with more stabilization. A/D converter is to convert the analog signals to the digital signals. Then the digital signals can readily interface to microprocessor for signal collection, conversion, processing and attitude computation. The computed attitude information is transferred into PC through RS-232.

Figure 4:
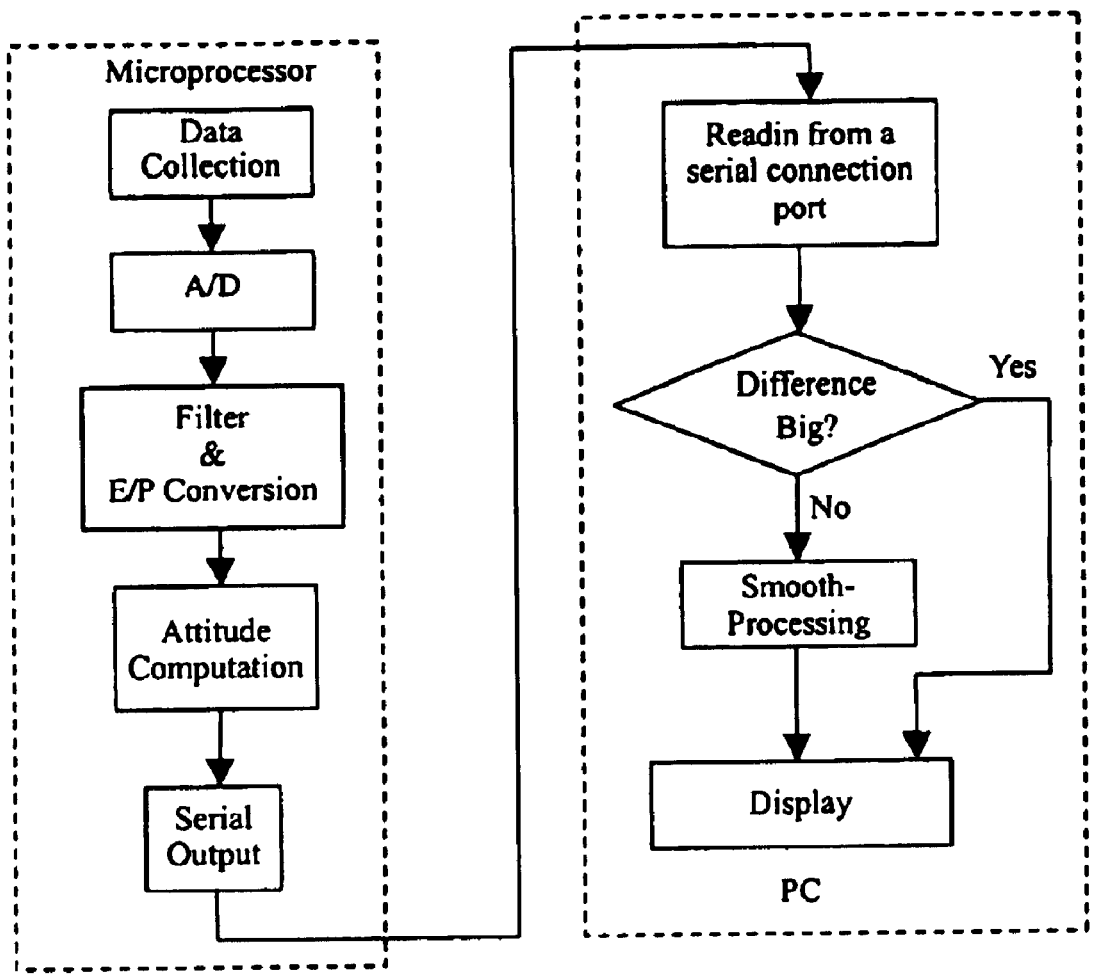
FIG. 4 is the software flow chart of the present invention.

The software flow chart is shown in FIG. 4. The software includes: data collection 51, A/D conversion 52, signal-syncretizing 53(signal-filter, E/P signal-conversion), misalignment compensation 54, attitude computation 55, serial output 56, and Operation-Display interface 50 in PC. The signals flow is as: the sensors' electrical signals are detected, A/D converted, filtered, further converted to physical signals, and through misalignment compensation processing, then computed to get attitude angles (the above steps all proceed in microprocessor). The attitude angles are exported into PC through RS-232. In PC the attitude angles are read from a serial connection port 57, then conditionally smooth-processed 58 and 59, that is to apply smoothing to small variations and little or no smoothing for large change in attitude outputs. The smooth-processing 59 is carried out as:

If, $|angle(n)-angle(n-1)| < ss$

Then, $attitude(n) = a_0 \cdot angle(n) + a_1 \cdot angle(n-1)$

Where, angle(n),angle(n−1) are the current attitude outputs and their backward shift, attitude(n) is the smoothed attitude, ss is threshold value, $a_0, a_1$ are constant coefficients, $0 < a_0 < 0.2$, $a_1 = 1 - a_0$.

The processed attitude results are finally displayed on Operation-Display interface 60.

Figure 5:
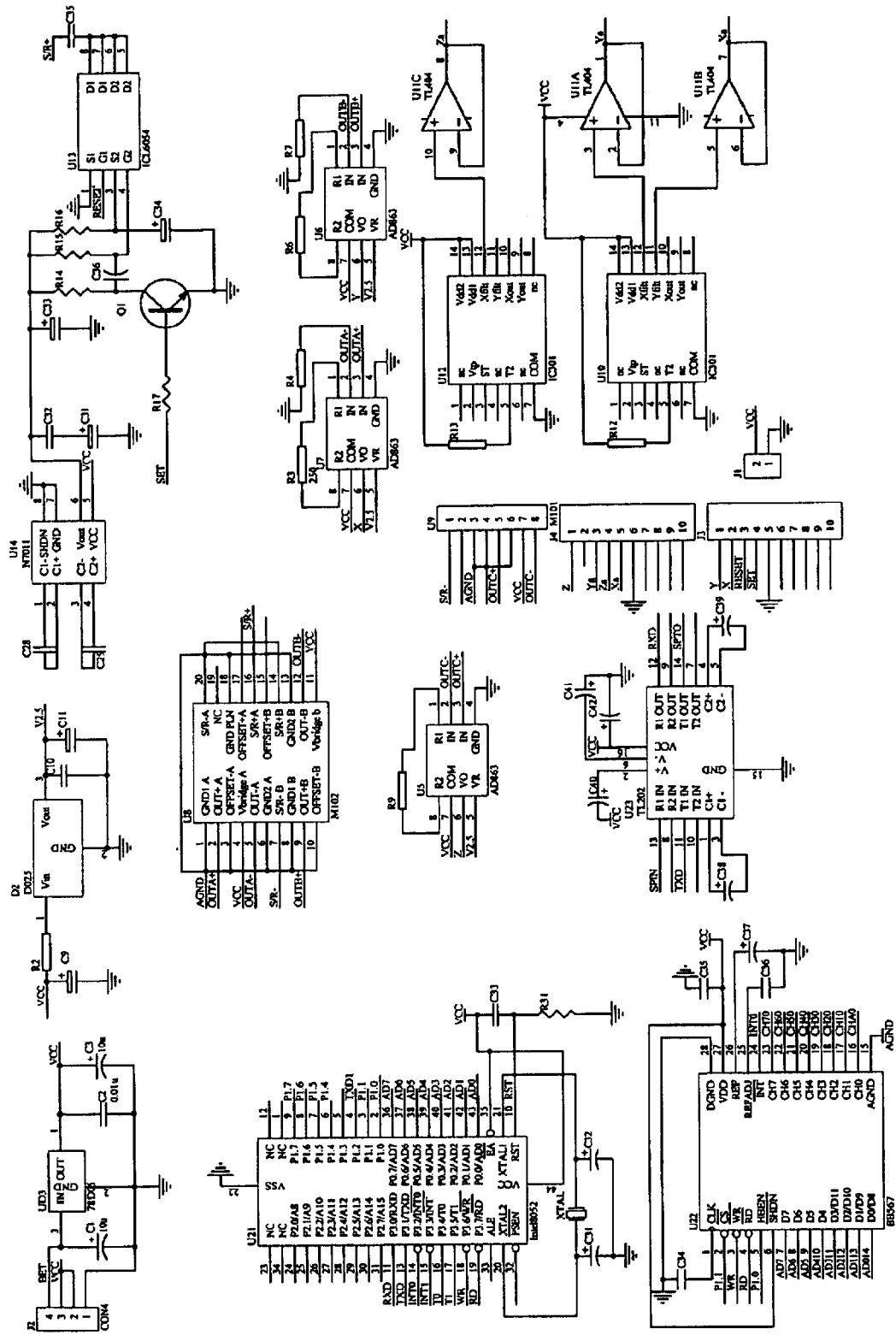
FIG. 5 is the circuit diagram of best mode for carrying out the present invention.
Figures 1, 5:
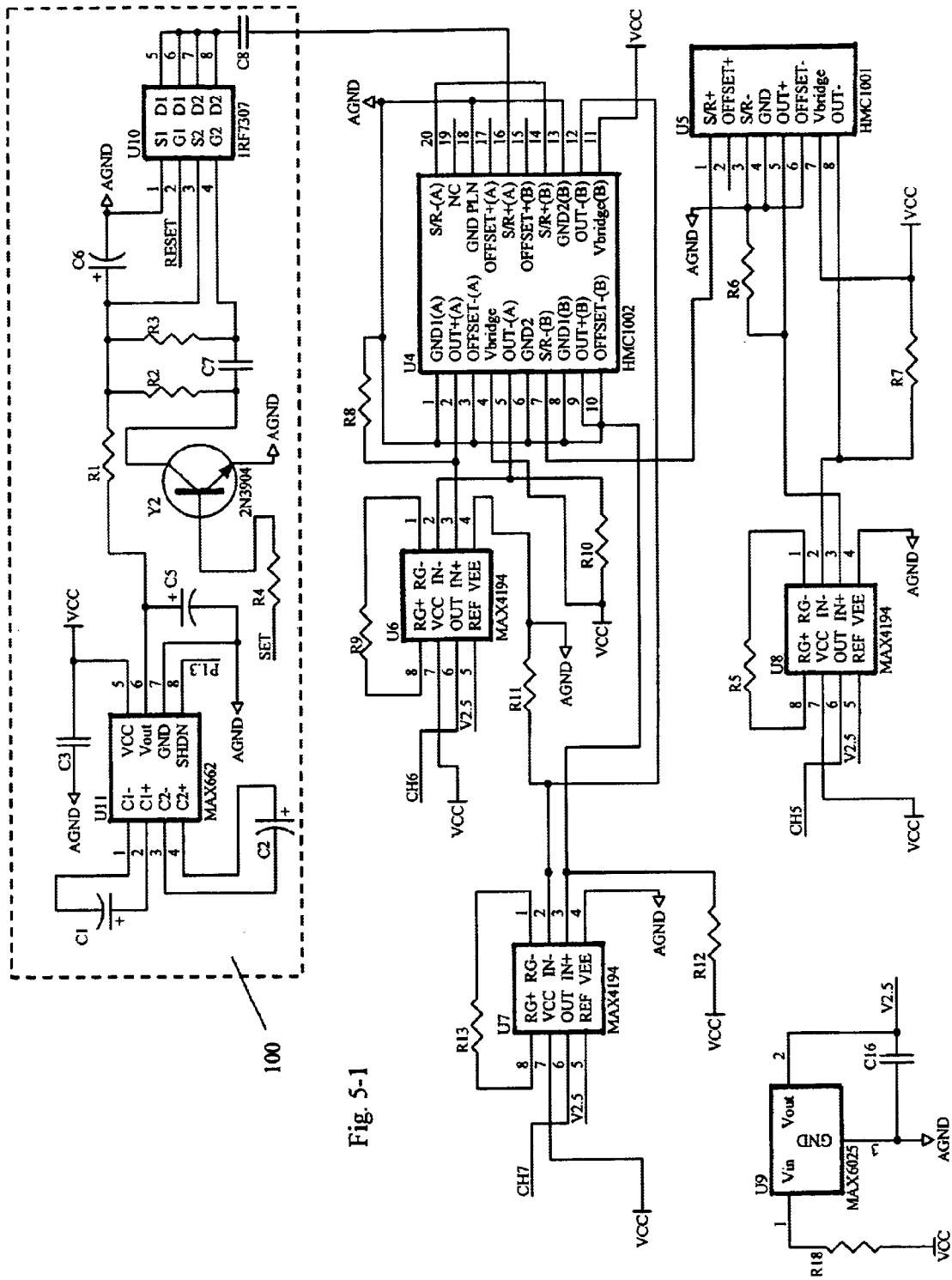
Figures 2, 5:
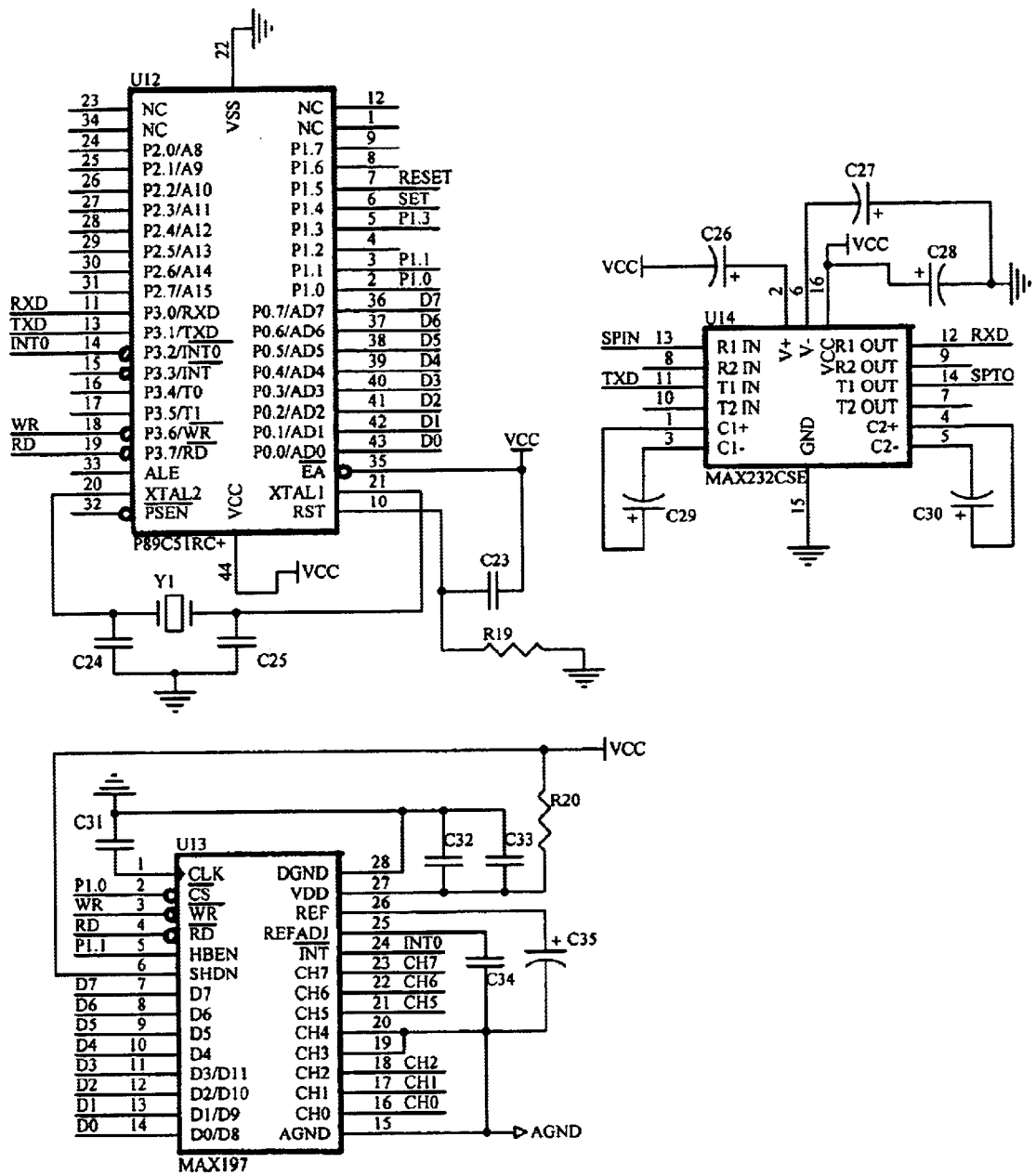
Figures 3, 5:
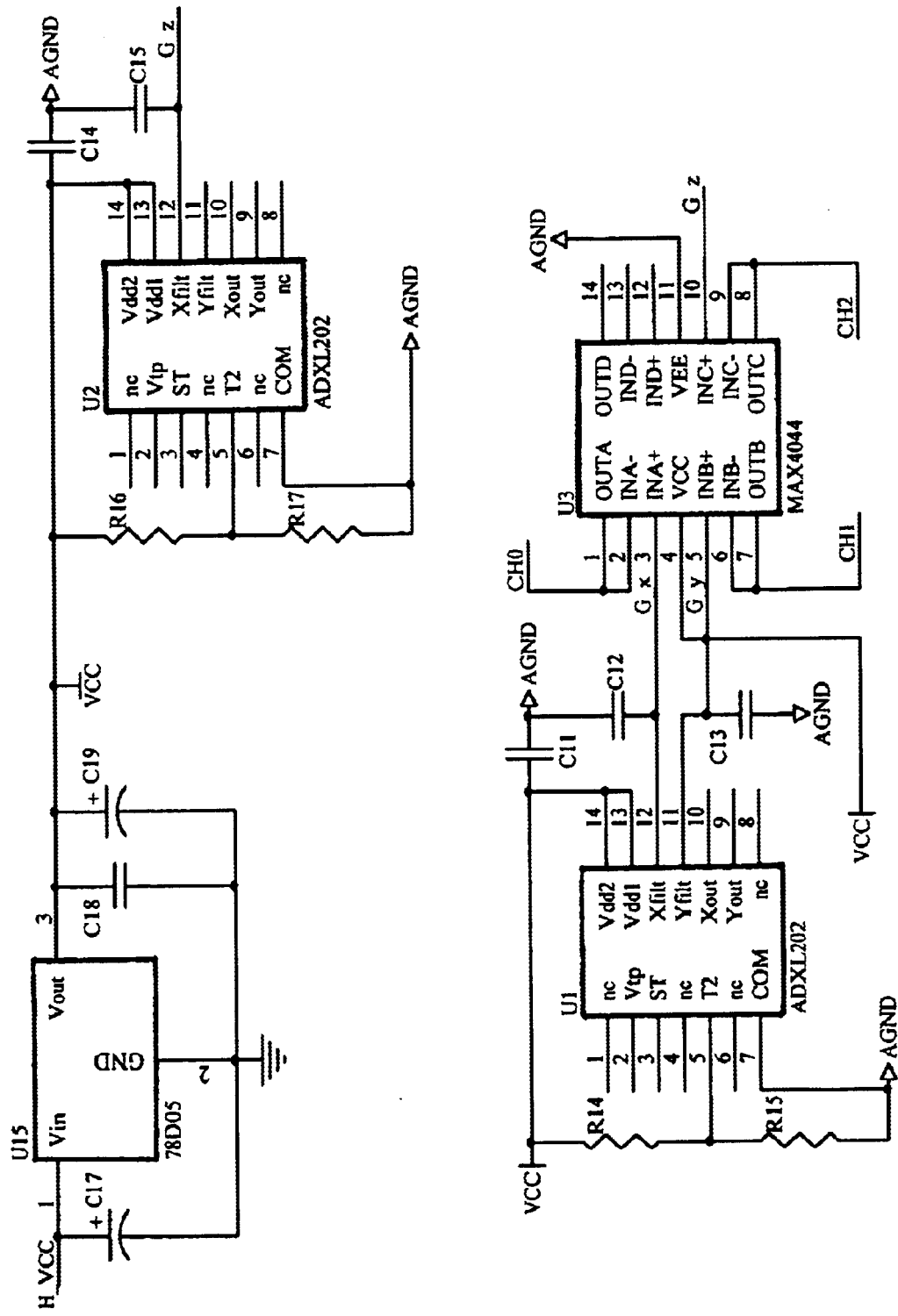

FIG. 5 depicts the circuit diagram of this mode. The power supply should be stabilized through 78D05 U15 before connect to the circuit. The C17, C18 and C19 are three capacitors around 78D05. The function of C17 is to stabilize input-voltage, C18 and C19 are used for smoothing fluctuation of out-voltage. Put the power supply switch on, then the microprocessor P89C51RC+U12 with resistor R19, capacitors C23, C24, C25 and oscillator Y1 (Y1, C24 and C25 provide clock-signal for microprocessor) begins to read the outputs of the accelerometers two ADXL202 U1 and U2 (C11 and C14 are filter-capacitors of supply voltage. Capacitors C12, C13 and C15 are added at output pins to implement low-pass filtering for antialiasing and noise reduction. The period of the power supply is set for the channels of accelerometers by resistors R14, R15, R16 and R17), and the two-axis magnetometer HMC1002 U4 and single-axis magnetometer HMC1001 U5 (Resistors R6, R7, R8, R10, R11 and R12 are used to trim switchpoint), through 12 bit A/D converter MAX197 U13 with resistor R20, capacitors C31, C32, C33, C34 and C35. C31 between the CLK pin of U13 and GND is necessary for selecting internal clock mode of A/D. R20, C32 and C33 make up of the filter circuit. Thereinto the accelerometer signals are Rail-to-Rail treated through MAX4044 U3. And the magnetometer signals are amplified through amplifiers MAX4194 U6, U7, U8 respectively with gain-setting resistors R9, R13 and R5. MAX6025 U9 with capacitor C16 and resistor R18 is to supply 2.5V reference-voltage for the amplifiers. Wherein C16 will reduce the amount of overshoot and assist the circuit's transient response, R18 is to limit the supply current. Data output serially using the RS-232 standard MAX232CSE U14 is transferred to most personal computers. The MAX232CSE has two internal charge-pumps that convert +5V to ±10V for RS-232 driver operation. Wherein the first converter uses capacitor C29 and C26 to double the +5V input to +10V, and the second converter uses capacitor C30 and C27 to invert +10V to −10V. Capacitor C28 is used for stabilizing supply-voltage.

In Set/Reset pulse circuit 100 encircled by dashed line (reference from Honeywell), the SET and RESET signals are generated from the microprocessor and are used to control the NPN General Purpose Amplifier 2N3904 Y2 and HEXFET Power MOSFET IRF7307 U10, as well as resistors R1, R2, R3, R4, and capacitors C6, C7, C8, to create Set/Reset current pulse. The magnitude of the Set/Reset current pulse depends on the output voltage of MAX662 U11, which regulates 5V power supply to the claimed 12V voltage. MAX662 uses internal charge pumps and external capacitors C1, C2 to generate +12V. C3 is the input bypass capacitor and C5 is output filter capacitor.

Figure 6:
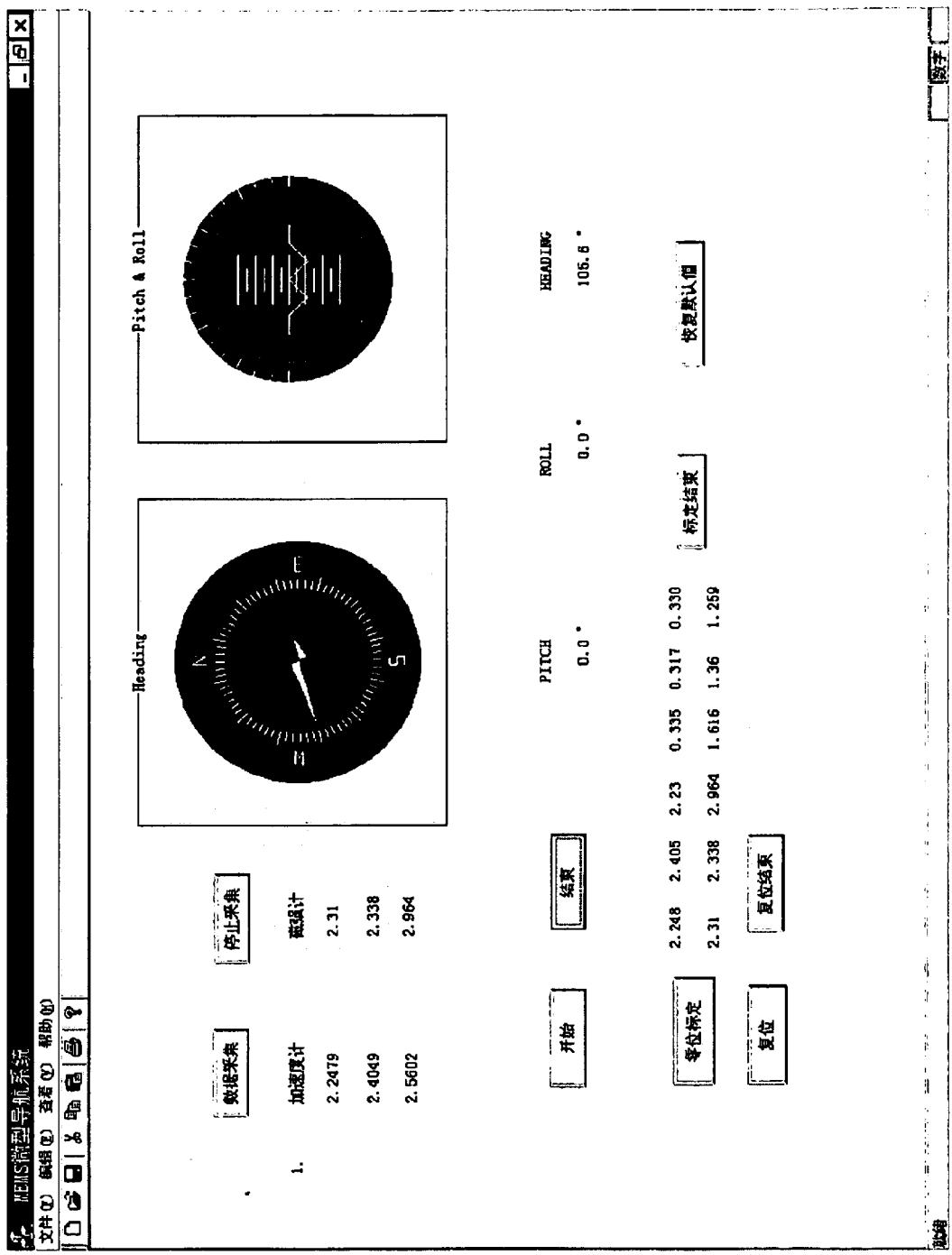
FIG. 6 is the schematic view of Operation-Display interface.

The schematic view of Operation-Display interface is shown in FIG. 6. In the top left side is presented Pitch&Roll graphical display 61 and Heading graphical display 62, and pitch, roll and heading numerical display 63 64 65 is listed below the graph. Below attitude numerical display, a pair of buttons "Display" 66 and "Stop" 67 are used to activate and stop attitude display; "Update Frequency" 68 is used to set the specific update frequency of attitude display. "Declination Angles" 69 is used to set the declination between the forward direction of the detector and the true geographical north; "Geography Heading" 70 and "Tare Heading" 71 are respectively used to display the true geographic heading and display the relative heading from any initial heading. Furthermore, in the top right side of interface, included "Set/Reset" function region 80 (Set/Reset technique is for eliminating the effects of past magnetic effects, reference from Honeywell), wherein "Start" 81 and "End" 82 buttons are used to activate and finish Set/Reset, "Check" 83 is used to check up if the Set/Reset is success or failure; In the under right side of interface, included Calibration function region 90 for calibrating zero-value $v_0$ and scale factor $k_v$ of three-axis magnetometers, "Start" 91 and "End" 92 are used to startup and stop the calibration, the below six windows show calibration parameters (the left three windows 93 94 95 show the zero values and the right three 96 97 98 show the scale factors corresponding to X, Y, and Z magnetic axis), "Default" 99 is to default the calibration parameters to be aforehand-setting values. For the calibration parameters of the accelerometers, the parameters are fixed and stored in microprocessor beforehand as they are not affected by external environment.

The detector followed by this mode can measure a full-scale range of attitude, that is −90°~+90° for pitch, −180°~+180° for roll, 0°~360° for heading. The attitude accuracy is excelled 1° for the full-scale range. It can also be applied in uncertain effect field to detect attitude of vehicle. By optical alignment, the mode can further improve the performances in measurement accuracy that is 0.2° for tilt and 0.5° for heading.

After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. A Micro Electro-mechanical System (MEMS) based micro azimuth-level detector comprising:
   multi-sensors,
   an analog/digital (A/D) converter,
   a microprocessor for signal processing,
   an RS-232 electrical interface, and
   a PC having an Operation-Display software,
   wherein the multi-sensors comprise three accelerometers and three magnetometers, the three accelerometers are assembled along three orthogonal axes and having a processing circuit, and the three magnetometers are assembled along three orthogonal axes and have a processing circuit, a micro-cube with three orthogonal coated mirrors for optical alignment, and wherein analogue signals from the multi-sensors are converted into digital signals by the A/D converter, sent to and processed in the microprocessor, and further transmitted via the RS-232 electrical interface to be shown in the PC.

2. The micro azimuth-level detector of claim 1, wherein the digital signals are processed in the microprocessor by signal syncretizing and attitude computation, and sent via the RS232 to be shown in a graphical Operation-Display Software in the PC.

3. A method for determining attitude comprising obtaining electrical/analog signals from sensors, converting the electrical/analog signals into digital signals by an A/D converter, filtering the digital signals and processing the digital signals by electric/physical conversion, eliminating misalignment in the processed digital signals by misalignment compensation based on optical alignment, computing attitude angles including pitch, roll and heading from the processed signals by Orientation Cosine Conversion of the earth's gravity and magnetic field and inverse tangent method, conditionally smooth-processing the computed attitude angles by applying a large amount of smoothing to small variations and little or no smoothing for large change in attitude outputs, displaying the conditionally smooth-processed attitude on an Operation-Display interface.

4. The method for determining attitude according to claim 3, wherein the processed triaxial gravity signals $x_g$, $y_g$, and $z_g$, and the processed triaxial magnetic signals $x_m$, $y_m$, and $z_m$ are obtained through the sensors and processed, and the attitude angles pitch, roll and heading are computed by (1) calculating roll $\gamma$ according to Table 1 and value of $\gamma_{ref}$ $\gamma_{ref}=\text{arctg}(y_g/z_g)$,

TABLE 1 =

| $z_g$ | $y_g$ | $\gamma$ | Quadrant |
|---|---|---|---|
| →0 | + | 90° | |
| →0 | − | −90° | |
| + | + | $\gamma_{ref}$ | (0°, 90°) |
| + | − | $\gamma_{ref}$ | (−90°, 0°) |
| − | + | $\gamma_{ref}$ +180° | (90°, 180°) |
| − | − | $\gamma_{ref}$ −180° | (−180°, −90°) |

(2) calculating pitch $\theta$ according to $\theta=-\text{arctg}(x_g \cdot \cos\gamma/z_g)$ (3) and calculating heading $\psi$ according to Table 2, $\psi_{ref}$, Xh and Yh, $Xh = x_m\cos\theta + (y_m\sin\gamma + z_m\cos\gamma)\sin\theta$ $Yh = z_m\sin\gamma - y_m\cos\gamma$ $\psi_{ref} = \text{arc}tg\left(\frac{z_m\sin\gamma - y_m\cos\gamma}{x_m\cos\theta + (y_m\sin\gamma + z_m\cos\gamma)\sin\theta}\right) = \text{arc}tg\left(\frac{Yh}{Xh}\right)$,

TABLE 2 =

| Xh | Yh | $\psi$ | Quadrant |
|---|---|---|---|
| →0 | + | 90° | |
| →0 | − | 270° | |
| + | + | $\psi_{ref}$ | (0°, 90°) |
| + | − | 360° +$\psi_{ref}$ | (270°, 360°) |
| − | + | 180° +$\psi_{ref}$ | (90°, 180°) |
| − | − | 180° +$\psi_{ref}$ | (180°, 270°). |

5. The method for determining attitude according to claim 3, wherein the misalignment is eliminated by (1) defining the orthogonal beam adjustment X-Y-Z of micro-cube as a datum orthogonal frame of groupware, (2) defining X'-Y'-Z' as a frame of the accelerometers in the orthogonal directions, and X"-Y"-Z" as a frame of the magnetometers in the orthogonal directions, (3) Aligning the datum frame X-Y-Z to North(magnetic north)-East-Ground by beam-based alignment, a relation between three accelerometers' readings $[X'_a, Y'_a, Z'_a]^T$ and independent components $[0,0, f_g]^T$ of the gravity field along N(X)-E(Y)-G(Z) being $$\begin{cases} X'_a = f_g \cdot \cos(X', Z) \\ Y'_a = f_g \cdot \cos(Y', Z) \\ Z'_a = f_g \cdot \cos(Z', Z); \end{cases} \text{and}$$

a relation between three magnetometers' readings $[X"_a, Y"_a, Z"_a]^T$ and independent components $[H_N, 0, H_G]^T$ of the earth's magnetic field along N(X)-E(Y)-G(Z) being $$\begin{cases} X"_a = H_N \cdot \cos(X", X) + H_G \cdot \cos(X", Z) \\ Y"_a = H_N \cdot \cos(Y", X) + H_G \cdot \cos(Y", Z) \\ Z"_a = H_N \cdot \cos(Z", X) + H_G \cdot \cos(Z", Z); \end{cases}$$

(4) Aligning X-Y-Z to East-Ground-North(magnetic north); A relation between three accelerometers' readings $[X'_b, Y'_b, Z'_b]^T$ and gravity XYZ-stage components $[0, f_g, 0]^T$ being $$\begin{cases} X'_b = f_g \cdot \cos(X', Y) \\ Y'_b = f_g \cdot \cos(Y', Y) \\ Z'_b = f_g \cdot \cos(Z', Y); \end{cases} \text{and}$$

a relation between three magnetometers' readings $[X"_b, Y"_b, Z"_b]^T$ and magnetic XYZ-stage components $[0, H_G, H_N]^T$ being $$\begin{cases} X"_b = H_N \cdot \cos(X", Z) + H_G \cdot \cos(X", Y) \\ Y"_b = H_N \cdot \cos(Y", Z) + H_G \cdot \cos(Y", Y) \\ Z"_b = H_N \cdot \cos(Z", Z) + H_G \cdot \cos(Z", Y); \end{cases}$$

(5) Aligning X-Y-Z to Ground-North(magnetic north)-East; a relation between three accelerometers' readings $[X'_c, Y'_c, Z'_c]^T$ and gravity XYZ-stage components $[f_g, 0, 0]^T$ being $$\begin{cases} X'_c = f_g \cdot \cos(X', X) \\ Y'_c = f_g \cdot \cos(Y', X) \\ Z'_c = f_g \cdot \cos(Z', X); \text{ and} \end{cases}$$

a relation between three magnetometers' readings $[X''_c, Y''_c, Z''_c]^T$ and magnetic XYZ-stage components $[H_G, H_N, 0]^T$ being $$\begin{cases} X''_c = H_N \cdot \cos(X'', Y) + H_G \cdot \cos(X'', X) \\ Y''_c = H_N \cdot \cos(Y'', Y) + H_G \cdot \cos(Y'', X) \\ Z''_c = H_N \cdot \cos(Z'', Y) + H_G \cdot \cos(Z'', X); \end{cases}$$

(6) computing Orientation Cosine Matrix Mg between the datum frame X-Y-Z and the acceleration frame X'-Y'-Z', $$Mg = \begin{bmatrix} \cos(X', X) & \cos(X', Y) & \cos(X', Z) \\ \cos(Y', X) & \cos(Y', Y) & \cos(Y', Z) \\ \cos(Z', X) & \cos(Z', Y) & \cos(Z', Z) \end{bmatrix},$$

(7) computing Orientation Cosine Matrix Mm between X-Y-Z and the magnetic frame X"-Y"-Z", $$Mm = \begin{bmatrix} \cos(X'', X) & \cos(X'', Y) & \cos(X'', Z) \\ \cos(Y'', X) & \cos(Y'', Y) & \cos(Y'', Z) \\ \cos(Z'', X) & \cos(Z'', Y) & \cos(Z'', Z) \end{bmatrix};$$

(8) switching three accelerometers' readings $[x'_g, y'_g, z'_g]^T$ and three magnetometers' readings' $[x'_M, y'_M, z'_M]^T$ into the orthogonal datum XYZ-stage components $[x_g, y_g, z_g]^T$ and $[x_M, y_M, z_M]^T$ using Mg and Mm when detecting attitude $$\begin{bmatrix} x_g \\ y_g \\ z_g \end{bmatrix} = Mg^{-1} \begin{bmatrix} x'_g \\ y'_g \\ z'_g \end{bmatrix},$$

$$\begin{bmatrix} x_M \\ y_M \\ z_M \end{bmatrix} = Mm^{-1} \begin{bmatrix} x'_M \\ y'_M \\ z'_M \end{bmatrix}.$$

6. The method for determining attitude according to claim 3, wherein conditionally smooth-processing to the computed attitude angles is performed by applying smoothing to small variations and little or no smoothing for large change in attitude outputs as:

If, $|\text{angle}(n) - \text{angle}(n-1)| < ss$

Then, $\text{attitude}(n) = a_0 \cdot \text{angle}(n) + a_1 \cdot \text{angle}(n-1)$ Where, angle(n), angle(n−1) are the current attitude outputs and their backward shift, attitude(n) is the smoothed attitude, ss is threshold value, $a_0$, $a_1$ are constant coefficients.

* * * * *